Patented Oct. 9, 1923.

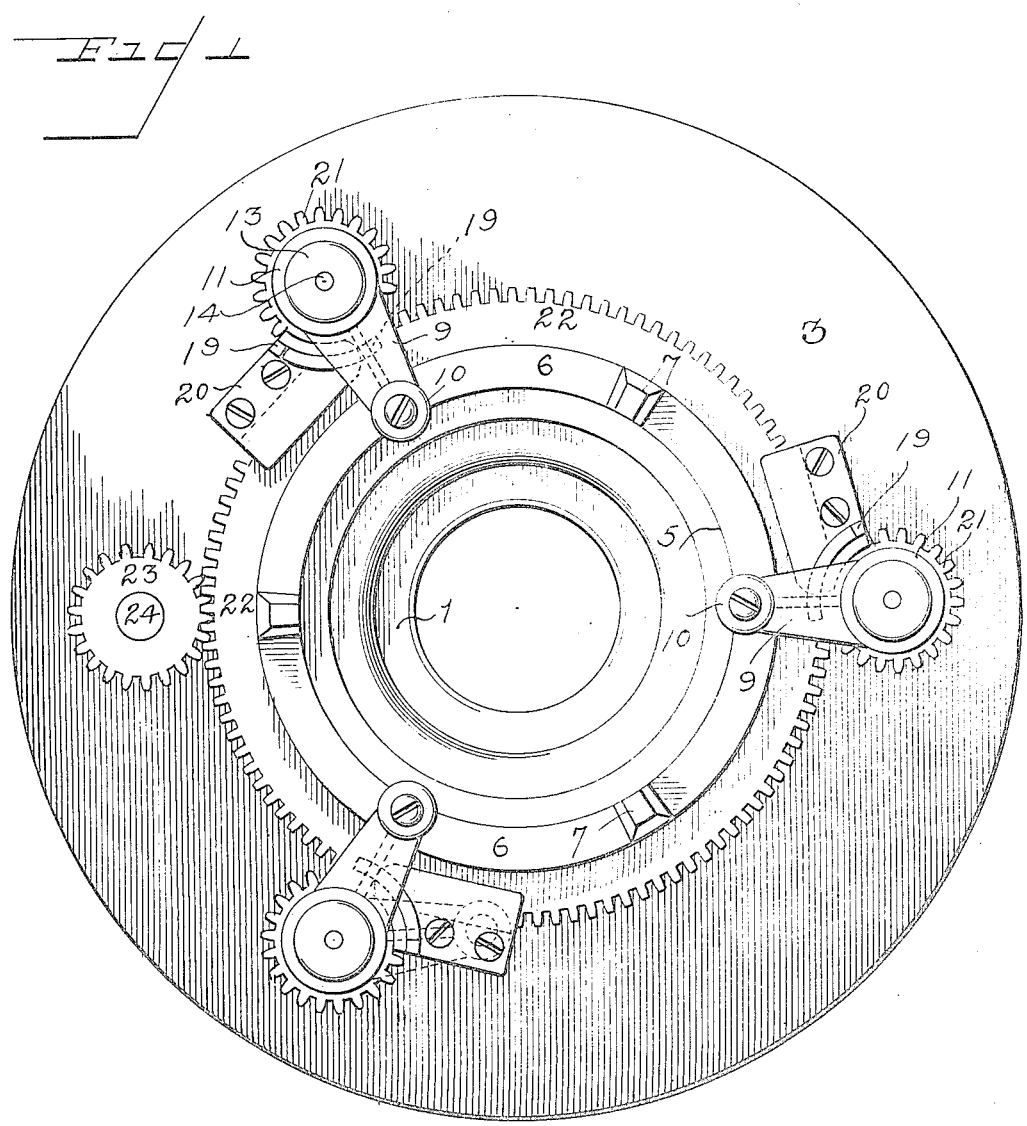

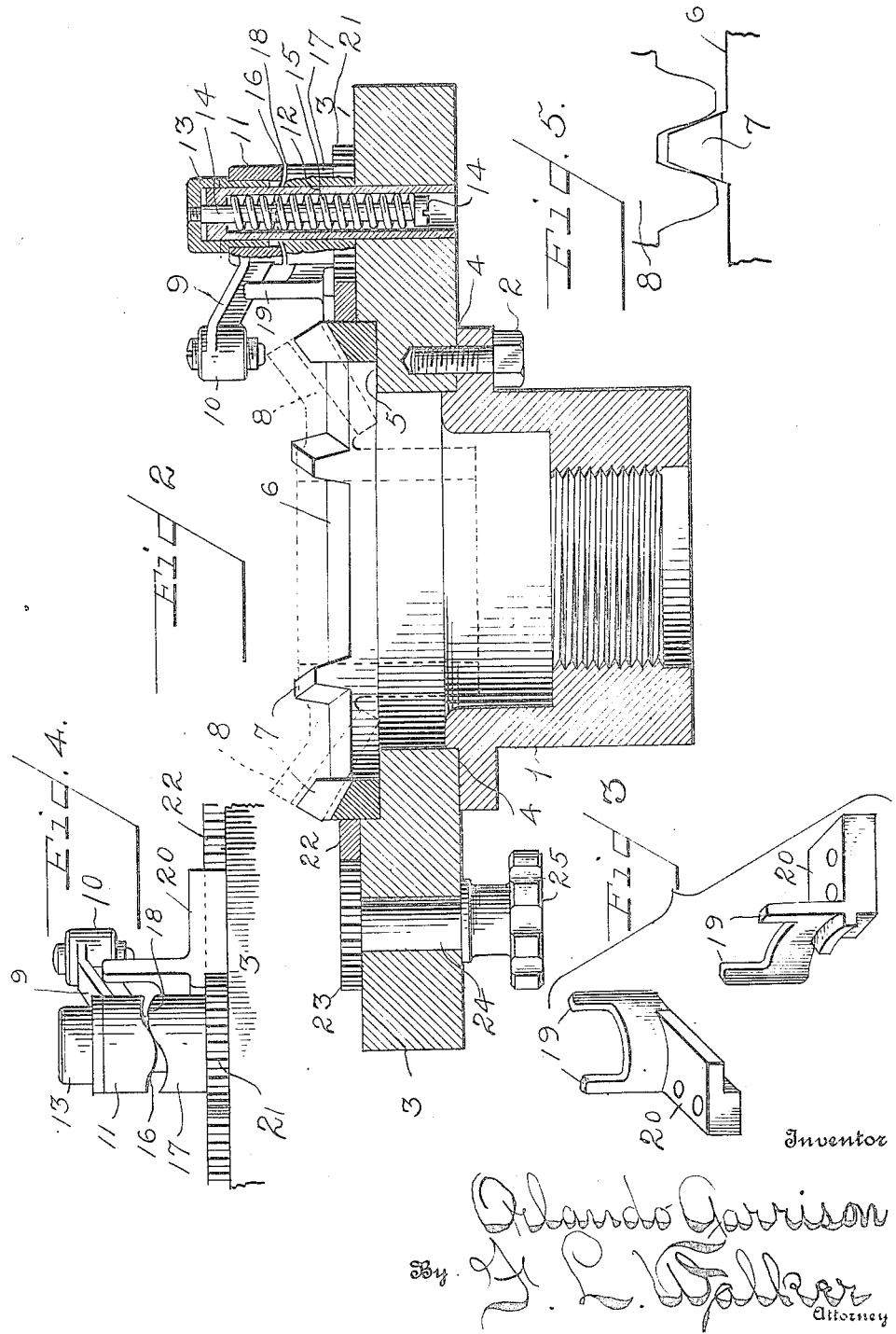

1,470,158

UNITED STATES PATENT OFFICE.

ORLANDO GARRISON, OF DAYTON, OHIO.

CHUCK.

Application filed November 12, 1918. Serial No. 262,235.

*To all whom it may concern:*

Be it known that I, ORLANDO GARRISON, a citizen of the United States, residing at Dayton, in the county of Montgomery and State of Ohio, have invented certain new and useful Improvements in Chucks, of which the following is a specification.

My invention relates to chucks or work holders, and in the embodiment herein shown is especially adapted for centering and holding bevel gears during a refinishing, boring or grinding operation. It will be understood however that by modification of the work locating means the device may be employed for articles other than bevel gears.

The object of the invention is to simplify the structure as well as the means and mode of operation of such devices, whereby they are not only cheapened in construction but will be more efficient in use, positive and accurate in operation, easily and quickly adjusted to engage and release the work, and unlikely to get out of repair.

A further object of the invention is to provide form of work locating element, interchangeable for different sizes and shapes of the article to be held.

A further object of the invention is to provide a series of work holding devices and means for simultaneously operating the same.

With the above primary and other incidental objects in view as will more fully appear in the specification, the invention consists of the features of construction, the parts and combinations thereof, and the mode of operation, or their equivalents, as hereinafter described and set forth in the claims.

In the drawings, Fig. 1 is a top plan view of the chuck or work holder, with the work removed. Fig. 2 is a transverse sectional view of the assembled chuck with a bevel gear in place therein. Fig. 3 is a detail view of the stop member for one of the work holding arms. Fig. 4 is a detail view of one of the work engaging members. Fig. 5 illustrates the engagement of the gear teeth with the location teeth.

Like parts are indicated by similar characters of reference throughout the several views.

In constructing the chuck or work holder there is employed a head 1, adapted for engagement with the spindle of the grinder, boring apparatus or other mechanism with which the chuck is to be employed, to which is securely attached as by bolts 2, an annular face plate 3.

The face plate 3 is preferably mounted in a rabbet 4 formed in the head 1. The face plate is in turn provided with a rabbet 5 in which is located a locating element 6 having thereon a plurality of spaced locating teeth or lugs 7. These teeth or locating lugs 7 in the present instance are beveled, and are shaped and spaced to agree with the pitch of the bevel gear 8, which in the drawing illustrates the work to be operated upon. The locating teeth or lugs 7 have the form of rack teeth which preferably engage and support the bevel gear 8 on the pitch diameter thereof. The teeth or lugs 7 are faced off at their tops to afford clearance between the top of the location teeth and the roots of the teeth of the bevel gear. Likewise they are cut deeper from their pitch line to their roots to afford clearance between the crown of the bevel gear tooth and the root of the location tooth. In other words the pitch line of the location teeth is raised above the normal pitch line position of rack teeth, thus shortening the addendum and increasing the dedendum of said teeth. By this means the bevel gear shown in the drawing is suspended by the interengagement of the gear teeth and the location teeth at the pitch line, there being clearance between the bevel gear and the annular locating element at both the crown and the root of the gear teeth.

It is to be understood that a different locating element 6 is provided for gears of each different size pitch, or angle. These locating elements are interchangeable in the chuck or holder. Likewise in the event it is desired to use the chuck for articles other than bevel gears, a corresponding locating element having suitably positioned locating points will be provided.

To hold the gear or article operated upon in fixed position upon the locating element 6 there are provided a plurality of retaining arms 9, carried upon the face plate and movable into and out of engagement with the work. In the embodiment shown in the drawing, three of such arms are employed. In a chuck of large size additional arms may be added if found necessary. The work retaining arms 9 are each provided with a work engaging head, 10, and a bearing head or sleeve 11 located at opposite ends of the arm. By means of the bearing head or sleeve 11 the retaining arm is mounted for both reciprocatory and oscillatory movement upon a hollow stud 12 carried by the face plate. In the drawing the head or sleeve has been shown as provided with a bushing to increase its wearing qualities. Enclosing the upper or free end of the stud 12 is a cap 13 resting upon the bushing within the head or sleeve 11 of the retaining arm. Extending through a reduced opening in the end of the stud 12 is a headed pin or stud 14 which is engaged with the cap 13. Surrounding the pin 14 is a retracting spring 15 one end of which abuts on the head of said pin and the opposite end upon the head of the hollow stud 12. This spring by its expansive tendency draws the retaining arm downward upon the stud 12 and onto the work. The bearing of the head 11 upon the stud being a free fit, any upward pressure of the work against the engaging head 10, turns the bearing head 11 slightly askew in relation with the stud 12 causing it to bear tightly or clutch the stud on opposite sides and so lock the retaining arm against movement. However such locking engagement is easily releasd and the head 11 freely reciprocated by applying a slight upward pressure to the head 11. The releasing pressure is applied substantially in line with the bearing stud, whereas the locking pressure is exterted through the leverage of the arm.

To effect the releasing pressure and also turn the retaining arm to inoperative position, the inner or lower end of the head or sleeve 11 is formed with an undulating cam face 16 agreeing with a like face upon a revoluble sleeve 17 also carried by the stud 12. The relation of the cam faces is such that when the retaining arm is engaged with the work a slight clearance is afforded between the cam faces. By a slight rotation of the sleeve 17, the cam faces 16 and 18 are brought into engagement one with the other and the bearing head 11 is pushed slightly upward, so releasing it from the work. The arm being then free to rotate and the spring 15 tending to hold it in engagement with the sleeve 17 with a tension greater than the resistance to its rotation the head 11 and arm 9 carried thereby will be oscillated in unison with the further movement of the revoluble sleeve 17 until the arm is arrested by engaging one finger or lug 19 of a stop 20. This stop comprises a base portion attached to the face plate from which projects a flange concentric with the pivotal stud 12 of the arm. At each end of the concentric flange is a projecting finger or lug 19 extending into the path of the arm and limiting its oscillatory movement in either direction. Upon engaging the stop finger 19 at the limit of its retrograde or opening movement, the arm 9 is arrested while the sleeve 17 continues to rotate, moving the cam faces further in relation one with the other thereby forcing the retaining arm upward an additional distance against the tension of the spring 15. Upon the closing or operative movement, the retaining arm moves with the rotation of the sleve 17 due to the frictional engagement of the cam surfaces under the influence of the spring 15 until the arm engages the opposite stop finger 19, which arrests the arm while the sleeve rotates an additional distance thus freeing the cam faces one from the other. This leaves the head 11 and arm 9 wholly under the influence of the spring 15, which draws the arm downward into firm engagement with the work. There is no effect of tight clamping, but a firm unyielding engagement equal to the tension of the spring. The downward pull of the spring upon the head 11 after the engaging head 10 is in contact with the work tends to skew the head upon the stud 12 causing it to bind against return or upward movement. The terms upward, downward, and like descriptive terms herein used refer to the position in which the device is shown in the drawing.

Means is provided for actuating the several retaining arms in unison. This consists of a gear pinion 21 formed on the lower end of each of the revoluble sleeves 17 and meshing with an annular gear 22 which rests upon the face plate and rotates about the exterior of the locating element 6.

The base portions of the stop members 20 overhang the annular gear 22, to retain it in position. The annular gear 22 is controlled by a master pinion 23 meshing therewith and carried upon a stud 24 revolubly mounted in the face plate. By manually rotating the knob or handle 25 carried by the stud 24, the annular gear 22 is rotated and with it the several pinions 21 formed on the sleeves 17. The retaining arms are thus actuated to and from operative positions in unison.

Three locating points upon the locating ring 6 will serve to center the work in relation with the chuck. Additional teeth or lugs 7 may be provided however in any number to distribute the strain of the refinishing or boring operation.

From the above description it will be apparent that there is thus provided a device of the character described, possessing the particular features of advantage before enumerated, as desirable, but which obviously is susceptible of modification in its form, proportions, detail construction or arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein described and shown, comprise but one of several modes of putting the invention into effect, and the invention is therefore claimed in any of its forms or modifications within the legitimate and valid scope of the appended claims.

Having thus described my invention I claim:

1. A work holder of the character described including a main body or support, work locating means thereon, a series of work engaging members capable of both axial movement to and from the work independent of each other and rotary movement into and out of engaging position, and means for simultaneously shifting said engaging members.

2. In a work holder, a main body or support, work locating means thereon, engaging members independently spring actuated into engagement with the work, and means common to all said members for initially shifting said members out of engagement with the work against the tension of their springs and thereafter for oscillating said members out of engaging positions.

3. In a chuck for bevel gears, a main body or support, an annular locating member carried thereby, a plurality of relatively fixed gear engaging teeth projecting therefrom, said teeth being so positioned and shaped in relation with the gear to be engaged that the teeth of the gear and those of the locating member will simultaneously engage substantially upon the pitch line of the gear at different radial points, the addendum and dedendum of each locating tooth being so proportioned as to afford clearance between the locating means and the root and crown of the gear tooth, and means for holding the gear in engagement with the locating member.

4. In a work holder of the character described, a main body or support, work locating means thereon, a work engaging arm, a stud on which the arm is slidingly movable, a spring adapted to move said arm upon said stud into engagement with the work, the engagement of the arm and work being at a point removed from the stud whereby the arm will be skewed upon the stud by its engagement with the work thereby causing it to bind thereon to prevent return movement and means for oscillating the arm about the stud adapted at the limit of its movement in one direction to slide the arm on the stud against the tension of the spring, and at the opposite limit of movement of the arm to permit the sliding movement of the arm under influence of the spring.

5. In a work holder of the character described, a main body or support, work locating means thereon, a work engaging member, a bearing stud upon which the work engaging member is mounted, said member being freely movable upon said stud into engagement with the work but adapted to clutch said stud to prevent return movement, and a sleeve upon said stud adapted upon movement to contact the work engaging member for effecting the release thereof from said stud, substantially as specified.

6. In a work holder of the character described, a main body or support, work locating means thereon, a work engaging member, a spring actuating said member into engagement with the work, and a cam member adapted to retract the member against the tension of the spring, said member and cam being mounted upon a common bearing stud, substantially as specified.

7. In a work holding device of the character described, a main body, work locating means thereon, a work engaging member, a spring actuating said member into engagement with the work, a bearing stud for said member, and a control member adapted to initially retract said member against the tension of the spring and subsequently oscillate said member about said stud.

8. In a work holder of the character described, a main body, work locating means thereon, a work engaging member, a bearing stud on which said member is located, an actuating spring for said member, a revoluble cam member also mounted on said stud adapted to reciprocate the work engaging member upon said stud against the tension of the spring, said work engaging member being adapted to subsequently rotate upon said stud in unison with the cam member.

9. In a work holder, a main body, work locating means thereon, a work engaging member, a bearing stud on which said engaging member is mounted for both oscillatory and reciprocatory movements, a control member adapted to transmit to said engaging member an oscillatory movement about said stud, a stop limiting the movement of the engaging member in one direction, said control member being capable of a further independent movement whereby said control member and engaging member are disengaged to permit the reciprocatory movement of the engaging member independent of said control member.

10. In a work holder, a main body, work locating means thereon, a work engaging member, a bearing stud on which said engaging member is mounted for reciprocatory and oscillatory movements, a control member adapted to transmit to said engaging member an oscillatory movement about said stud, a stop limiting the movement of the engaging member in one direction, said control member being capable of a further movement independent of the oscillatory movement of the engaging member whereby said engaging member is reciprocated upon said stud by the action of the control member during such further independent adjustment.

11. In a work holder, a main body, work locating means thereon, a plurality of work engaging members capable of oscillatory movement into and out of engaging positions and of reciprocatory movement in such position into and out of engagement with the work independent of each other, and means separable from said work engaging members when the latter are in operative position for simultaneously actuating said plurality of work engaging members.

12. In a work holder, a main body, work locating means thereon, a plurality of work engaging members, a gear member associated with each work engaging member, means connected with each gear member for alternately oscillating the work engaging members into and out of work engaging position and shifting said members into and out of engagement with the work while in work engaging position, upon the oscillation of said gear members, an actuating gear member common to the several first mentioned gear members and meshing therewith, and means to oscillate the last mentioned gear member to actuate the work engaging members in unison.

13. In a work holder, a main body, work locating means thereon, a plurality of work engaging members, means intermittently engagable with said work engaging members for simultaneously shifting said members into and out of operative positions and adapted to release the work engaging members for independent action when adjusted to operative position, including, a master gear, individual gear members associated with each engaging member and meshing with the master gear, intermittently engageable operative connections between the individual gear members and the work engaging members, and means for oscillating the master gear, substantially as specified.

14. In a work holder, a main body, work locating means thereon, a work engaging arm, a stud upon which the arm is slidable, a spring tending to slide the arm upon the stud until the end of said arm engages the work, the pressure of the arm upon the work tending to tilt said arm whereby its sliding bearing will bind upon the stud to resist return movement, and means for applying pressure to the arm in opposition to the spring at a point adjacent to the bearing of the arm upon said stud whereby the binding engagement will be relieved.

15. A work holder of the character described, including a main supporting body, work locating means thereon, a series of adjustable work engaging members, an actuating spring for each member tending to press it toward the work independent of the other member and means common to all said members for retracting the same against the tension of their respective springs.

16. In a work holder, a main body, work locating means thereon, a work engaging arm, a stud upon which the arm is capable of both sliding and rotary movement, a spring tending to slide the arm upon the stud, a control member also mounted on said stud for rotary movement, means for limiting the rotary movement of the arm to less range than that of the control member, said control member being adapted upon movement in one direction beyond the range of adjustment of the arm to slide the arm upon the stud against the tension of the spring and upon movement in the opposite direction beyond the range of adjustment of the arm to disengage the arm to permit sliding movement thereof under the influence of the spring.

In testimony whereof I have hereunto set my hand this 28 day of October, A. D. 1918.

ORLANDO GARRISON,

Witnesses:
 JOHN DINEEN,
 F. L. WALKER.